US006646874B2

(12) United States Patent
Pokharna et al.

(10) Patent No.: US 6,646,874 B2
(45) Date of Patent: Nov. 11, 2003

(54) MOBILE COMPUTER SYSTEM WITH DETACHABLE THERMOELECTRIC MODULE FOR ENHANCED COOLING CAPABILITY IN A DOCKING STATION

(75) Inventors: Himanshu Pokharna, San Jose, CA (US); Gregory M. Chrysler, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/880,509

(22) Filed: Jun. 12, 2001

(65) Prior Publication Data

US 2002/0186531 A1 Dec. 12, 2002

(51) Int. Cl.[7] .................................................. G06F 1/16
(52) U.S. Cl. ........................................... 361/687; 62/3.2
(58) Field of Search .......................... 62/3.1–3.7, 259.2, 62/383; 361/687, 699, 700; 136/225, 230, 212

(56) References Cited

U.S. PATENT DOCUMENTS

| 5,441,576 A | * | 8/1995 | Bierschenk et al. | ........ 136/203 |
|---|---|---|---|---|
| 5,456,081 A | * | 10/1995 | Chrysler et al. | ............... 62/3.7 |
| 5,704,212 A | * | 1/1998 | Erler et al. | ..................... 62/3.2 |
| 5,724,818 A | * | 3/1998 | Iwata et al. | ..................... 62/3.7 |
| 6,038,128 A | * | 3/2000 | Hood et al. | .................. 361/687 |
| 6,109,039 A | * | 8/2000 | Hougham et al. | ............ 62/3.7 |

* cited by examiner

*Primary Examiner*—Darren Schuberg
*Assistant Examiner*—Anthony Q. Edwards
(74) *Attorney, Agent, or Firm*—Blakely, Sokoloff, Taylor & Zafman LLP

(57) ABSTRACT

A computer system is described having additional cooling capabilities in a docking station for a mobile computer. The docking station includes P- and N-doped semiconductor thermoelectric components. The thermoelectric components are connected in series when the mobile computer engages with the docking station. A current flowing through a doped semiconductor causes heat to be transferred either in a direction of a current through the semiconductor component or in a direction opposite to a current in the thermoelectric components, depending on their doping. The thermoelectric components alternate from being P-doped to N-doped and the direction in which current flows alternates accordingly so that heat is transferred in one direction only. A heat pumping effect is created by the thermoelectric components which does not require high-pressure contact upon engagement of the mobile computer with the docking station.

21 Claims, 4 Drawing Sheets

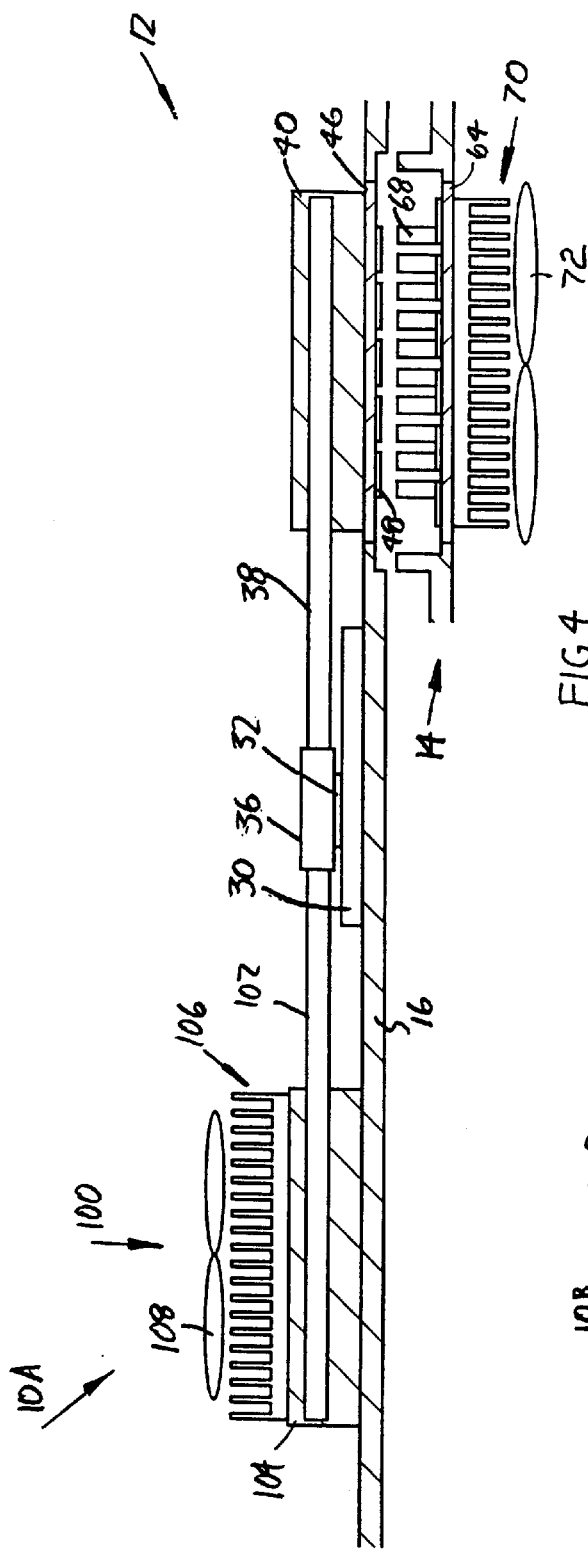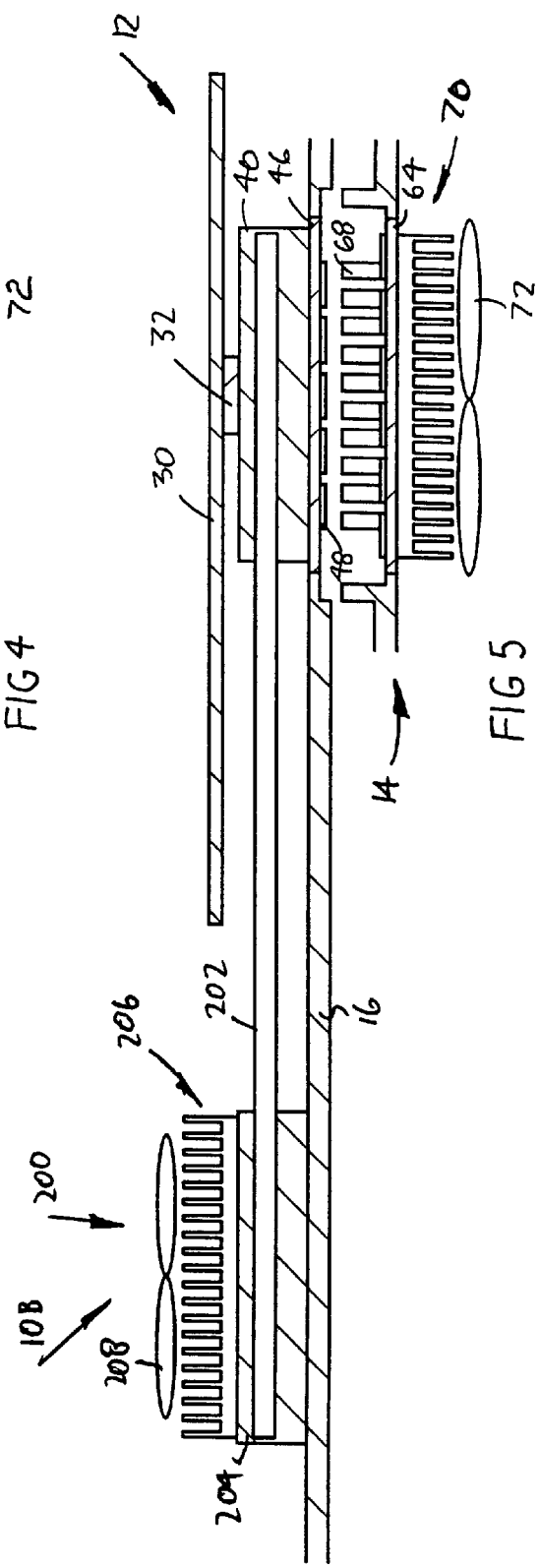

MOBILE COMPUTER SYSTEM WITH DETACHABLE THERMOELECTRIC MODULE FOR ENHANCED COOLING CAPABILITY IN A DOCKING STATION

BACKGROUND OF THE INVENTION

1. Field of the Invention

This invention relates to a computer system and its cooling.

2. Discussion of Related Art

A mobile computer such as a laptop computer or a notebook computer is often cooled with a computer fan located therein. The computer fan is driven from a battery of the mobile computer and only provides a limited amount of cooling for a processor of the mobile computer.

The mobile computer can usually be engaged with a port replicator such as a docking station. Cables are connected to the docking station which provide large amounts of electric power to the docking station. The additional power of the docking station is generally only used for reloading the battery of the mobile computer and for powering of the mobile computer while engaged with the docking station.

BRIEF DESCRIPTION OF THE DRAWINGS

The invention is further described by way of example with reference to the accompanying drawings wherein:

FIG. 4 is a cross-sectional side view of a computer system according to another embodiment of the invention; and FIG. 5 is a cross-sectional side view of a computer system according to a further embodiment of the invention.

DETAILED DESCRIPTION OF THE INVENTION

Figure 1:
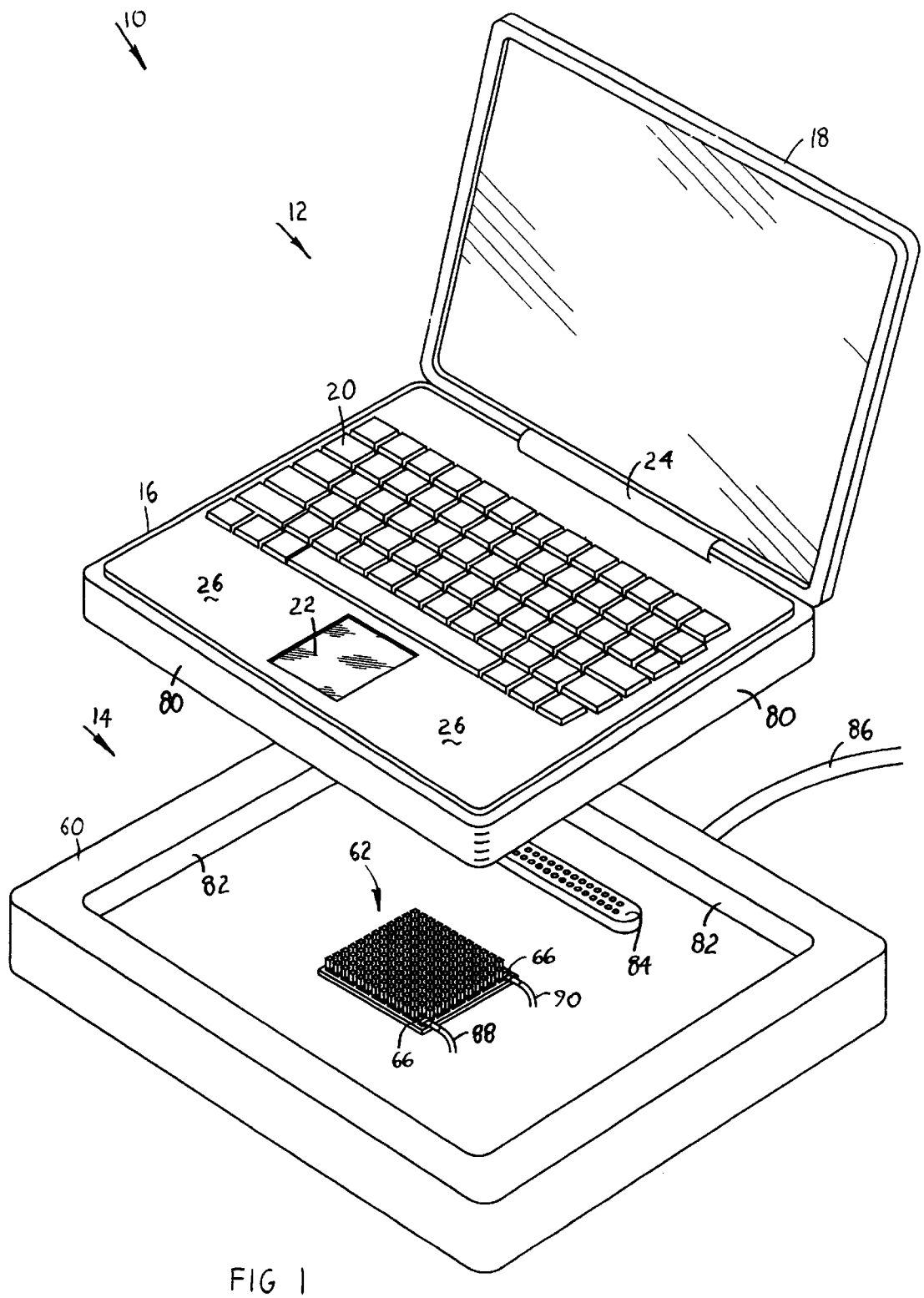
FIG. 1 is a perspective view of a computer system according to an embodiment of the invention.

FIG. 1 of the accompanying drawings illustrates a computer system 10 according to an embodiment of the invention including a mobile computer 12 and a port replicator in the form of a docking station 14.

Referring to FIG. 1, the mobile computer 12 includes a mobile computer housing 16, a screen 18, alphanumeric keys 20, and a track pad 22. The screen 18 is mounted to the mobile computer housing 16 by a hinge 24. The screen 18 is shown in an upright position wherein a person located in front of the mobile computer housing 16 can view a display on the screen 18. The screen 18 can also be folded down onto the mobile computer housing 16 into a compact arrangement allowing for transportability of the mobile computer 12.

The alphanumeric keys 20 extend out of an upper surface of the mobile computer housing 16 and the track pad 22 is mounted to the mobile computer housing 16 in a position closer to the user than the alphanumeric keys 20. The mobile computer housing 16 has surfaces 26 on which a user can locate his or her wrists. The user can move a finger across the track pad 22 to control a cursor on the display 18. The user can also depress on the alphanumeric keys 20 to generate text on the display 18 or otherwise control operation of the mobile computer 12. The components of the mobile computer 12 thus for described are of course conventional and are not further elaborated on herein.

Figure 2:
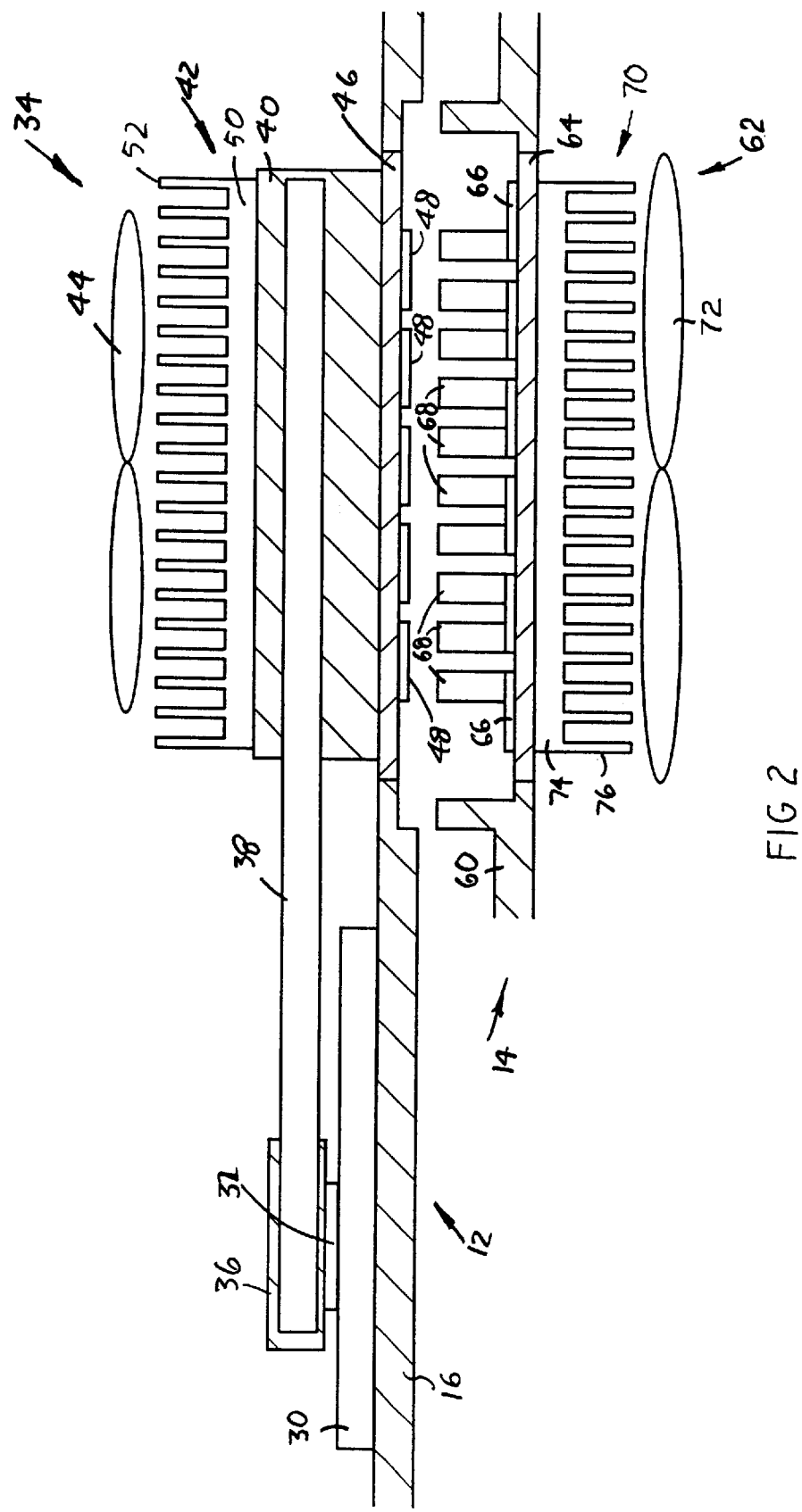
FIG. 2 is a cross-sectional side view of the computer system shown in FIG. 1.

Referring to FIG. 2, the mobile computer 12 further includes a logic board 30, a logic processor 32, and a computer heat dissipation arrangement 34.

A logic board 30 is mounted on an internal surface of the mobile computer housing 16. The processor 32 is mounted to the logic board 30. Heat is generated by the processor 32 when being operated and it is required to cool the processor 32 in order to maintain its functional integrity.

The computer heat dissipation arrangement 34 includes a heat plate 36, a heat pipe 38, a cold plate 40, a computer heat sink 42, a computer fan 44, a cold thermoelectric plate 46, and a first set of metal electric links 48.

The heat plate 36 is located against the processor 32 so that heat generated by the pipe processor 32 is transferred to the heat plate 36. One end of the heat pipe 38 is attached to the heat plate 36.

The cold thermoelectric plate 46 is mounted in an opening in a lower surface of the mobile computer housing 16. An upper surface of the cold thermoelectric plate 46 faces into an internal volume in the mobile computer housing 16 and a lower surface of the cold thermoelectric plate 46 faces out of the mobile computer housing 16. The cold plate 40 is mounted on the cold thermoelectric plate 46 and is thermally connected thereto.

An end of the heat pipe 38 opposing the end connected to the heat plate 36 is attached to the cold plate 40. The heat pipe 36 has a wicking layer on an internal surface thereof. A fluid in the heat pipe 38 condenses on the wicking layer when it is cooled and evaporates from the wicking layer when it is heated. Should the cold plate 40 be cooled, and the heat plate 36 be heated, the fluid will evaporate from the wicking layer in the vicinity of the heat plate 36. The vaporized fluid will then flow through the heat pipe 38 to the cold plate 40 where the fluid will then be cooled by the cold plate 40 and condense on the wicking layer. The condensed fluid will then flow back through the wicking layer to the heat plate 36.

The computer heat sink 42 includes a spreader plate 50 and fins 52 extending from the spreader plate 50. The spreader plate 50 is located against the cold plate 40 and is thermally connected thereto. A computer fan 44 is mounted in a position over the fins 52 so that rotation of the computer fan 44 causes movement of air to move over the fins 52.

The electric links 48 are all secured to a lower surface of the cold thermoelectric plate 46. The cold thermoelectric plate 46 is made of a material such as aluminum oxide which is thermally conductive and electrically insulating. Because the cold thermoelectric plate 46 is thermally conductive, heat can be transferred from the cold plate 40 through the cold thermoelectric plate 46 to the electric links 48. The processor is thus thermally coupled to the cold thermoelectric plate 46.

The docking station 14 includes a port station engager in the form of a docking station engager 60 and a docking station heat dissipation arrangement 62. The docking station heat dissipation arrangement 62 includes a hot thermoelectric plate 64, a second set of metal electric links 66, a plurality of thermoelectric components 68 made of a semiconductor material, a docking station heat sink 70, and a docking station fan 72.

The hot thermoelectric plate 64 is made of the same material as the cold thermoelectric plate 46 and is mounted to the docking station engager 60 in an opening of the docking station engager 60. An upper surface of the hot thermoelectric plate 64 faces upwardly out of the docking station engager 60 and a lower surface of the hot thermoelectric plate 64 faces down into an internal space of the docking station engager 60.

The metal electric links 66 are mounted to an upper surface of the hot thermoelectric plate 64. The thermoelectric components 68 are secured to upper surfaces of the metal electric links 66. Each metal electric link 66 has two of the thermoelectric components 68 mounted thereto. The respective metal electric link 68 thereby electrically connects two of the thermoelectric components 68 to one another. Two of the thermoelectric components 68 in a pair are thus electrically connected to one another through one of the metal electric links 66. Respective pairs of the thermoelectric components 68 are electrically disconnected from one another.

The docking station heat sink 70 includes a spreader plate 74 and fins 76 extending from the spreader plate 74. The spreader plate 74 is mounted to a lower surface of the hot thermoelectric plate 64. The fins 76 extend down away from the spreader plate 74. The docking station fan 72 is mounted to the docking station engager 60 in a position wherein air is blown by the docking station fan 72 over the fins 76.

Referring again to FIG. 1, the mobile computer housing 16 has a substantially rectangular outer periphery 80 when viewed from above. The docking station engager 60 has a recessed shape with a substantially rectangular inner periphery 82. The inner periphery 82 of the docking station engager 60 is complementary to the outer periphery 80 of the mobile computer housing 16. The mobile computer housing 16 can be engaged with the docking station engager 60 by inserting the mobile computer housing 16 into the inner periphery 82. Because of the complementary shapes of the inner periphery 82 and the outer periphery 80, alignment between the mobile computer housing 16 and the docking station engager 60 is provided. Other engagement mechanisms are possible.

The docking station heat dissipation arrangement 62 is located within the inner periphery 82. The docking station 14 also includes other components that are conventional, including a docking port 84 and cables 86 connected to the docking port 84. The docking port 84 engages with a complementary docking port on the mobile computer housing 16 when the mobile computer housing 16 is moved from a position as shown in FIG. 1 into a position wherein the mobile computer housing 16 engages with the docking station engager 60. Signals can be provided between the cables 86 and the mobile computer 12 through the docking port 84 and the docking port on the mobile computer housing 16. Peripheral devices such as a mouse, a disk drive etc. may be connected to the docking station engager 60. A port replicator alone generally does not have such peripheral devices. Power can also be provided through the cables 86 through the docking port 84 to the mobile computer 12. It should also be noted that power is provided through the cables 86 to a power lead 88 secured to the docking station engager 60 and that a ground lead 90 secured to the docking station engager 60 is connected to one of the cables 86. The power lead 88 is connected to one of the metal electric links 66 and the ground lead 90 is connected to another one of the metal electric links 66.

Figure 3:
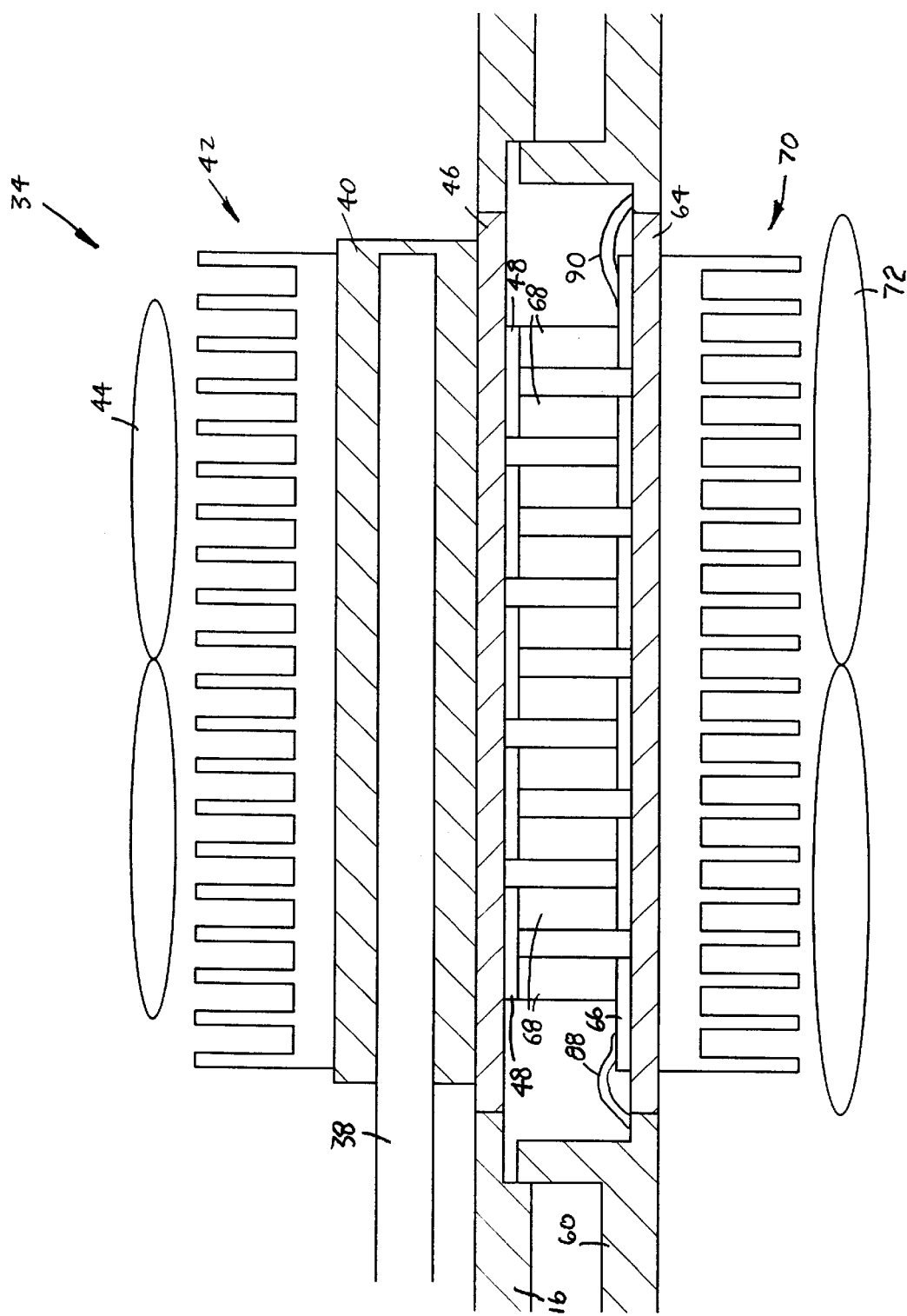
FIG. 3 is a view similar to FIG. 2 after a mobile computer of the computer system is engaged with a docking station of the computer system.

In use, the mobile computer 12 is engaged with the docking station 14 by inserting the mobile computer housing 16 into the inner periphery 82. Engagement of the mobile computer 10 with the docking station 14 moves the components of the mobile computer from the position shown in FIG. 2 into the position shown in FIG. 3. Each one of the thermoelectric components 68 is then in contact with one of the metal electric links 48. As previously mentioned, respective pairs of the thermoelectric components 68 are connected to each respective metal electric link 66. The metal electric links 48 now connect one thermoelectric link 68 of one pair with one thermoelectric link 68 of another pair. All the thermoelectric components 68 are then connected in series. An electric voltage and current is provided through the power lead 88 to a first of the thermoelectric components 68. Current flows through that thermoelectric component in a direction from one of the metal electric links 66 to one of the metal electric links 48. Current then flows through the metal thermoelectric link 48 to another one of the thermoelectric components 68. The current then flows through that thermoelectric component 68 in a direction from the metal electric link 48 to another one of the metal electric links 66. The current thus flows in a direction from the hot thermoelectric plate 64 to the cold thermoelectric plate 46 through odd ones of the thermoelectric components 68 located in series and in a direction from the cold thermoelectric plate 46 to the hot thermoelectric plate 64 through even ones of the thermoelectric components 68 located in series.

Odd ones of the thermoelectric components 68 located in series are P-doped and even ones of the thermoelectric components 68 located in series are N-doped. Heat is transferred through the N-doped thermoelectric components 68 in a direction in which current flows therethrough and heat is transferred through the P-doped thermoelectric components in a direction opposite to the direction in which current flows therethrough. Heat is thus transferred through both the odd and even thermoelectric components 68 in a direction from the metal electric links 48 to the metal electric links 66 all located thermally in parallel. The metal electric links 48 are thermally connected to the cold thermoelectric plate 46 and the metal electric links 66 are thermally connected to the hot thermoelectric plate 64. A current through the thermoelectric components 68 thus causes heat to be transferred from the cold thermoelectric plate 46 to the hot thermoelectric plate 64.

Proper heat transfer between a hot and a cold component generally requires high-pressure contact between the two components. High-pressure contact is however not required between the thermoelectric components 64 and the metal electric links 48 because of an active heat pumping effect created when current flows through the thermoelectric components 68.

Heat is transferred from the logic processor 32 to the cold plate 40 and from the cold plate 40 to the heat pipe 38. The fluid within the heat pipe 38 evaporates and flows to the heat plate 36. Heat is transferred from the heat plate 36 to the cold thermoelectric plate 46, causing the fluid within the heat pipe 38 to condense and flow back to the cold plate 40 for recirculation. The heat is then transferred from the cold thermoelectric plate 46 to the hot thermoelectric plate 64 as discussed. The heat then transfers from the hot thermoelectric plate 64 through the spreader plate 74 to the fins 76. The heat is then convected from the fins 76 to atmosphere. Rotation of the fan 72 blows air over the fins 76 to accelerate transfer of heat from the fins 76 to atmosphere.

More heat is transferred from the cold plate 40 to the spreader plate 50 and from the spreader plate 50 to the fins 52. The heat is then convected from the fins 52 to atmosphere. Rotation of the fan 44 causes air to blow over the fins 52 thus accelerating transfer of heat from the fins 52 to atmosphere.

It can thus be seen that additional cooling capability is provided by the docking station 14. More electric power is available at the docking station 14 through the cables 86 for provision to the power lead 88. Because of the additional power available at the docking station 14, the thermoelectric components 68 can easily be powered.

When the mobile computer 12 is disengaged from the docking station 14, the logic processor 32 can still be cooled with the computer heat dissipation arrangement 34 alone. The fan 44 is powered from a battery supply of the mobile computer 12. The additional cooling capability of the docking station heat dissipation arrangement 62 however allows for more power to be provided to the processor 32 when the mobile computer 12 is engaged with the docking station 14 without danger of overheating of the processor 32.

FIG. 4 illustrates a computer system 10A according to another embodiment of the invention. The system 10A is similar to the system 10 of FIG. 2 and like reference numerals indicate like or similar components. No heat sink is attached to the cold plate 40 of the system 10A. Instead, a separate cooling system 100 is provided for cooling the processor 32 when not engaged with or engaged with the docking station 14. The cooling system includes a heat pipe 102, a cold plate 104, a heat sink 106, and a fan 108. The cold plate is secured to the mobile computer housing 16. The heat pipe 102 has one end structurally secured to an thereby thermally connected to the heat plate 36. Heat transfers through the heat pipe 102 to the cold plate 104. The heat sink 106 is secured to the cold plate 106 and the fan 108 blows air over fins of the heat sink 106. The heat conducts from the cold plate 104 to fins of the heat sink 106 and the fan 108 blows air over the fins of the heat sink 106.

FIG. 5 illustrates a computer system 10B according to a further embodiment of the invention which is similar to the systems 10 and 10A, like reference numerals indicating like components. A processor 32 is mounted to a circuit board 30 and the processor is located directly against a cold plate 40. Heat conducts directly from the processor 32 to the cold plate from where it is transferred to a cold thermoelectric plate 46. An additional cooling arrangement 200 is provided for cooling of the processor when the mobile computer 12 is engaged with or disengaged from the docking station 14. The cooling arrangement includes a heat pipe 202, a cold plate 204, a heat sink 206 and a fan 208. The heat pipe 202 has one end structurally and thermally connected to the cold plate 40 and an opposing end structurally and thermally connected to the cold plate 204. Heat conducts from the cold plate 40 to the heat pipe 202 and from the heat pipe 202 to the cold plate 204. The heat then conducts from the cold plate 204 to fins of the heat sink 206. The fan 208 blows air over fins of the heat sink 206 to accelerate cooling.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. A port replicator other than a docking station may for example be used in a similar manner.

What is claimed:

1. A computer system comprising:
   a mobile computer housing;
   a logic processor mounted to the mobile computer housing;
   a first thermoelectric plate mounted to the mobile computer housing and thermally connected to the logic processor;
   a port station engager, the mobile computer housing being disengageable from and receivable by the port station engager;
   a second thermoelectric plate mounted to the port station engager; and
   a thermoelectric component, which thermally connects the thermoelectric plates to one another when the mobile computer housing is moved from being disengaged from to being received by the port station engager and being made of a material that transfers heat from the first thermoelectric plate to the second thermoelectric plate when current conducts therethrough, the thermal plates being disengaged from one another when the mobile computer housing moves from being received by to being disengaged from the port station engager.

2. The computer system of claim 1 wherein the thermoelectric component is mounted to the port station engager.

3. The computer system of claim 1 further comprising:
   a plurality of thermoelectric components, each made of a semiconductor material and each thermally connecting the thermoelectric plates to one another when the mobile computer housing is received by the port station engager.

4. The computer system of claim 1 comprising:
   a plurality of thermoelectric components, at least some of which are made of a semiconductor material;
   a first set of electric links connecting first ends of pairs of thermoelectric components to one another when the mobile computer housing is received by the port station engager; and
   a second set of electric links connecting respective pairs of thermoelectric components to one another when the mobile computer housing is moved from being disengaged from to being received by the port station engager so that a current can flow in series through thermoelectric components of one pair followed by the thermoelectric components of another pair.

5. The computer system of claim 4 wherein each set of links is mounted to a respective thermoelectric plate.

6. The computer system of claim 4 wherein each thermoelectric plate is thermally conductive and electrically insulating.

7. The computer system of claim 1 wherein the mobile computer housing and the port station engager have complementary interengageable formations.

8. The computer system of claim 1 further comprising:
   a computer heat sink mounted to the port station engager and thermally connected to the second thermoelectric plate.

9. The computer system of claim 1 further comprising:
   a port station fan mounted to the port station engager, rotation of the port station fan causing air to flow to accelerate cooling of the second thermoelectric plate.

10. The computer system of claim 1 further comprising:
    a computer fan mounted to the mobile computer housing, rotation of the computer fan causing air to flow to accelerate cooling of the processor.

11. The computer system of claim 1 further comprising:
    a screen mounted to the mobile computer housing; and
    a set of alphanumeric keys mounted to the mobile computer housing.

12. A computer system comprising:
    a port station engager;
    a first thermally conductive and electrically insulating thermoelectric plate secured to the port station engager;

a first set of links secured to the first thermoelectric plate;

a plurality of thermoelectric components, each link of the first set having a respective pair of the thermoelectric components secured thereto;

a mobile computer housing disengageable from and receivable by the port station engager;

a logic processor mounted to the mobile computer housing;

a second thermally conductive and electrically insulating thermoelectric plate secured to the mobile computer housing and thermally connected to the processor;

a second set of links secured to the second thermoelectric plate, each alternately connecting and disconnecting a thermoelectric component of one of the pairs with a thermoelectric component of another one of the pairs when the mobile computer housing is moved respectively from being disengaged from to being received by the port station engager and from being received by and being disengaged from the port station engager.

13. The computer system of claim 12 wherein the mobile computer housing and the port station engager have complementary interengageable formations.

14. The computer system of claim 12 further comprising:

a computer heat sink mounted to the port station engager and thermally connected to the second thermoelectric plate.

15. The computer system of claim 12 further comprising:

a port station fan mounted to the port station engager, rotation of the port station fan causing air to flow to accelerate cooling of the second thermoelectric plate.

16. The computer system of claim 12 further comprising:

a computer fan mounted to the mobile computer housing, rotation of the computer fan causing air to flow to accelerate cooling of the processor.

17. The computer system of claim 12 further comprising:

a screen mounted to the mobile computer housing; and a set of alphanumeric keys mounted to the mobile computer housing.

18. A method of cooling a logic processor of a mobile computer comprising:

engaging a mobile computer housing with a port station engager thereby thermally coupling the processor to a thermoelectric plate mounted to the port station engager through a thermoelectric component and allowing current to flow through the thermoelectric component;

conducting current through the thermoelectric component; and disengaging the mobile computer housing from the port station engager, thereby not allowing current to flow through the thermoelectric component.

19. The method of claim 18 wherein, when engaging the housing with the port station engager, the processor is thermally coupled to the thermoelectric plate through a plurality of thermoelectric components located thermally in parallel.

20. The method of claim 19 wherein, when and due to engaging of the housing with the port station engager, the thermoelectric components are electrically connected to one another.

21. The method of claim 20 wherein, when and due to engaging of the housing with the port station engager, at least three thermoelectric components are connected electrically in series.

* * * * *